US012343616B2

(12) United States Patent
Iwanowski et al.

(10) Patent No.: US 12,343,616 B2
(45) Date of Patent: Jul. 1, 2025

(54) INTERACTIVE ENTERTAINMENT SYSTEM

(71) Applicant: DISNEY ENTERPRISES, INC., Burbank, CA (US)

(72) Inventors: Przemyslaw Iwanowski, San Francisco, CA (US); Bob Hickman, Simi Valley, CA (US); Brent D. Strong, Santa Clarita, CA (US); Sarit Ghildayal, Los Angeles, CA (US); Matthew S. Daly, La Crescenta, CA (US); Jeffrey Elbert, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 368 days.

(21) Appl. No.: 16/832,703

(22) Filed: Mar. 27, 2020

(65) Prior Publication Data
US 2021/0279893 A1     Sep. 9, 2021

Related U.S. Application Data

(60) Provisional application No. 62/987,214, filed on Mar. 9, 2020.

(51) Int. Cl.
*A63F 13/213*     (2014.01)
*G06N 20/00*     (2019.01)
(Continued)

(52) U.S. Cl.
CPC ........... *A63F 13/213* (2014.09); *G06N 20/00* (2019.01); *G06T 7/248* (2017.01); *G06T 7/292* (2017.01);
(Continued)

(58) Field of Classification Search
CPC .... G06V 40/10; G06V 40/103; G06V 40/107; G06V 40/20; G06V 40/23; G06V 40/28;
(Continued)

(56) References Cited

U.S. PATENT DOCUMENTS

| | | | |
|---|---|---|---|
| 9,463,379 B1* | 10/2016 | Brister | A63F 13/42 |
| 2006/0013440 A1* | 1/2006 | Cohen | G06F 3/017 |
| | | | 382/103 |

(Continued)

OTHER PUBLICATIONS

Slembrouck et al., "Multiview 3D Markerless Human Pose Estimation from OpenPose Skeletons", Feb. 2020, Springer, Proceedings Advanced Concepts for Intelligent Vision Systems (ACIVS 2020), LNCS12002, p. 166-178. (Year: 2020).*

(Continued)

*Primary Examiner* — Vincent Rudolph
*Assistant Examiner* — Timothy Choi
(74) *Attorney, Agent, or Firm* — Dorsey & Whitney LLP

(57) ABSTRACT

The present disclosure describes a method for providing an interactive experience. The method includes illuminating, by an enhancer, an area with light having wavelength invisible to humans. A plurality of image detectors capture at least two images of a person in the area including a portion of the light reflected from the person. A processing element determines a first skeletal feature of the person based on the at least two images. The processing element determines a position characteristic of the first skeletal feature; constructs, from the first skeletal feature, a vector in three dimensions corresponding to the position characteristic; and outputs an interactive effect based on the position characteristic.

29 Claims, 11 Drawing Sheets

(51) Int. Cl.
*G06T 7/246* (2017.01)
*G06T 7/292* (2017.01)
*G06T 7/80* (2017.01)
*G06V 10/143* (2022.01)
*G06V 10/44* (2022.01)
*G06V 10/764* (2022.01)
*G06V 40/10* (2022.01)
*G06V 40/20* (2022.01)

(52) U.S. Cl.
CPC .............. *G06T 7/80* (2017.01); *G06V 10/143* (2022.01); *G06V 10/454* (2022.01); *G06V 10/764* (2022.01); *G06V 40/103* (2022.01); *G06V 40/113* (2022.01); *G06V 40/23* (2022.01); *G06T 2207/10048* (2013.01); *G06T 2207/20081* (2013.01); *G06T 2207/30196* (2013.01)

(58) Field of Classification Search
CPC ........ G06V 10/143; G06T 2207/30196; G06T 7/292; G06T 7/80; G06T 2207/10048; A63F 13/213
See application file for complete search history.

(56) References Cited

U.S. PATENT DOCUMENTS

| | | | |
|---|---|---|---|
| 2006/0210146 A1* | 9/2006 | Gu | G01B 11/2513 382/154 |
| 2009/0217315 A1* | 8/2009 | Malik | H04N 7/181 725/9 |
| 2011/0289455 A1 | 11/2011 | Reville et al. | |
| 2011/0310220 A1* | 12/2011 | McEldowney | G02B 5/1895 348/42 |
| 2012/0056800 A1 | 3/2012 | Williams et al. | |
| 2014/0160055 A1* | 6/2014 | Margolis | G06F 1/1684 345/173 |
| 2016/0170603 A1 | 6/2016 | Bastien et al. | |
| 2017/0374333 A1* | 12/2017 | Ashra | H04N 9/3185 |
| 2020/0073483 A1* | 3/2020 | Berenzweig | G06N 5/04 |

OTHER PUBLICATIONS

Extended European Search Report issued in European Patent Application No. 21161476.3 on Jul. 8, 2021 (7 pages).

* cited by examiner

INTERACTIVE ENTERTAINMENT SYSTEM

CROSS REFERENCE TO RELATED APPLICATIONS

This application claims the benefit of priority pursuant to 35 U.S.C. § 119 (e) of U.S. provisional patent application No. 62/987,214, filed 9 Mar. 2020, entitled "Pose Detection System," which is hereby incorporated by reference herein in its entirety.

BACKGROUND

Motion capture systems that detect and translate the pose of a person, including the position and motion of the person's figure to a computer for use in rendering virtual characters or other visual effects, are widely used in gaming, entertainment, filmmaking, and other applications. Traditional motion capture systems that detect a person's pose may use markers placed on the person, for instance at joints of limbs, on the skin above facial muscles, clothing, or other locations on, or associated with, a person. The markers are then detected in images by cameras and used to re-create the pose in a virtual space, for example generating an animation of the pose via a computer. The virtual pose of the person may enable the person to interact with a virtual environment, or may be used as the basis for the pose of a virtual character.

However, as these types of traditional systems require a person to wear markers on his or her body and that such markers are accurately positioned, such systems require intensive calibration and setup processes, which limits their application and use. As such, these types of systems may not allow seamless, immersive theatrical, gameplay, theme park ride, or other entertainment experiences.

BRIEF SUMMARY

A method for providing an interactive experience is disclosed. The method includes illuminating, by an enhancer, an area with light having a wavelength invisible to humans. A plurality image detectors receive at least two images of a person in the area including a portion of the light emitted by the enhancer and reflected from the person. A processing element determines a first skeletal feature of the person based on the at least two images. The processing element determines a position characteristic of the first skeletal feature. The processing element constructs, from the first skeletal feature, a vector in three dimensions corresponding to the position characteristic. An interactive effect is outputted based on the position characteristic.

A method of calibrating a camera is disclosed. The method includes positioning a calibration target within a field of view of a camera and capturing, by the camera, an image of the calibration target. A difference between the image of the target and a physical characteristic of the calibration target is determined. A characteristic of the camera based on the difference is determined. The target is automatically moved by an actuator on a predefined path within the field of view of the camera.

A method of calibrating a camera is disclosed. The method includes positioning a calibration target in a physical environment within a field of view of a plurality of cameras. An image of the calibration target is captured by each of the plurality of cameras. A reference point is determined in the image. A respective position of the reference point with respect to each of the plurality of cameras is determined. Position information of the camera is adjusted based on the respective position of the reference point. A virtual representation of the field of view in three dimensions is constructed based on the reference point in the physical environment.

A system for augmenting a user experience is disclosed. The system includes a wearable article adapted to be worn by a person. The wearable article includes a processing element that encodes data related to a virtual characteristic of the wearable article and a transmitter that transmits the encoded data to an entertainment environment. A detector in the entertainment environment detects the transmitted data. A processing element receives the data detected by the transmitter and changes a characteristic of the entertainment environment according to the virtual characteristic of a wearable article.

DETAILED DESCRIPTION

Figure 1A:
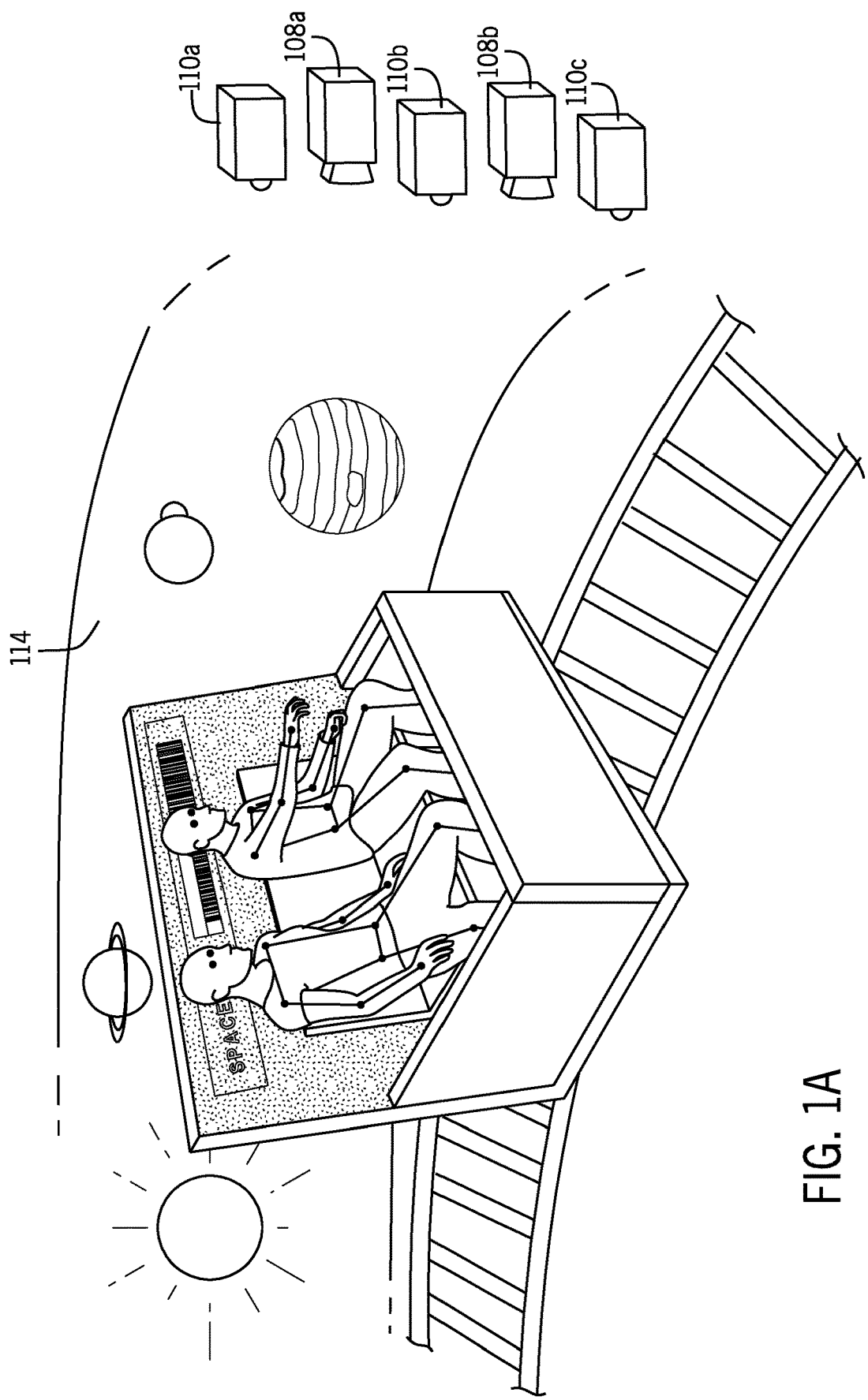
FIG. 1A is a side perspective view of a theme park ride including a pose detection system.

The present disclosure is related to a system and methods to utilize pose and physical movements to interact with an environment, render effects, or interactive media. The system is able to detect a pose or gesture of a user's figure and includes an image detector to capture images that can be analyzed to determine a pose. A pose may include a position of a figure of a user. For example, a physical pose may include the positions, locations, and/or movements of a figure, including for example, a head, neck, torso, arm, hand, finger, leg, foot, or toes. Some poses are gestures that include a movement or a position of a part of the body meant to express an idea, intent, opinion, or emotion. The system may also include an enhancer such as an illuminator that helps to increase the detectability of a pose by the camera. Utilizing the captured images, the system generates a virtual pose corresponding to the physical pose of a figure in a virtual environment. A virtual pose may be a virtual representation of an aspect of a physical pose of a figure. A virtual pose may be a representation of a physical pose such as a representation stored in a memory, or operated on by a processing element of a computing device. For example, the system may use artificial intelligence and/or machine learning algorithms to detect the locations of the bones and the joints therebetween of a physical pose. Based on the detected locations, the system may create virtual bone objects linked by virtual joint objects about which the bone objects may move. As a pose changes or initiates, such as due to movement of a person, the system captures successive images, updating the position in the virtual space, which can then be used to output various effects or interactions within an entertainment environment (e.g., amusement park ride, virtual reality, game, or the like). For example, the camera may have a sufficiently fast frame rate to capture changes in a pose over time and thus capture position and motion information of the physical pose and apply such position and motion information to the virtual pose.

As a specific example, the system may capture images of poses as a user travels on a moving vehicle through an amusement park attraction, and as the poses change, the system outputs different effects, such as displayed images, or physical effects such as a fountain, corresponding to the changes in poses.

In some instances, the system may include multiple cameras that detect a pose in three dimensional space so that the system can more accurately and quickly generate a virtual pose in a virtual three dimensional space.

The system may include an imager such as a projector or display that displays images on a surface, such as a screen, wall, or other area of the environment. The detected poses may allow the user to interact with objects displayed or presented in the virtual environment. For example, the system may display images of a virtual environment including characters from comic books, cartoons, movies or video game characters, or other types of interactive content objects, elements, or situations that can be varied based on a user's input.

In some examples, the system may include an accessory, such as a wearable article or distinguishing element, that is worn by a user to enhance the interaction between the user and the system. The accessory can be more easily detectable by the system and/or transmit data about its physical or virtual properties to allow different effects, outputs, or the like, based on characteristics of the accessory. For example, the accessory may include light sources that illuminate or are reflective to be more easily detected in images captured by the camera. Additionally or alternatively, the accessory may transmit data to the system including accessory characteristics, e.g., accessory type (hat, gauntlet, wand, ring or the like), color, user information, character association, effect types or virtual abilities, etc., which can be used to generate different effects or outputs in the experience.

In some examples, the system may be self-calibrating. As one example, the system may include a calibration target that assists in calibrating the camera, for instance by assisting in calibrating a relationship between the virtual environment and the physical environment or between multiple cameras. In some examples, the calibration target can be a creative graphic or feature that may serve the dual purpose of enabling camera calibration and adding to the creative aesthetic of the physical environment. The calibration target may be a two dimensional graphic or a textured three dimensional feature or surface.

In some examples, the system may be calibrated by external devices. For example, the calibration target can be mounted on an actuator, such as a robot, mechanical rig, cart, motor, linkage, pneumatic or hydraulic piston, track, movable mount, or the like, that moves the target relative to a camera, such as on a predefined path, to calibrate the camera. In other examples, a camera may be mounted to an actuator that moves the camera relative to a calibration target to calibrate the camera.

FIG. 1 illustrates a pose detection system 100. The pose detection system 100 includes cameras 108*a* and 108*b*, enhancers 110*a*, 110*b*, 110*c* within a physical environment 104, as well as one or more computing devices in communication with the cameras 108*a*, 108*b* and the enhancers 110*a*, 110*b*, 110*c*. More or fewer cameras and/or enhancers may be used, as desired. One or more users 112 may be located within the physical environment 104, for instance in an area 118, in the example illustrated in FIG. 1, two users 112 are located in the area 118. The pose detection system 100 may be adapted to detect poses of one or more users in the area 118. The physical environment 104 may be part of an entertainment attraction, such as an amusement park ride or experience, and in some instances, the area 118 may include a movable vehicle, that moves the users 112 through the environment 104 (e.g., on a track or other pathway), or otherwise may be a stationary element (e.g., seat or viewing space). In some examples, a pose detection system can be statically installed in the physical environment. For instance, elements of a pose detection system, such as cameras or enhancers, can be statically installed on a wall, stand, building, ceiling, floor, or other structure and can detect a pose as a user passes by the cameras. In some examples, a pose detection system can be mounted to a vehicle or other structure that moves with users. An advantage of in-vehicle pose detection is that it reduces influence of the moving vehicle so that accurate pose-detection can be performed with lower demand on computational resources. For example, an entertainment attraction may have a vehicle that moves users through the environment and that includes elements of the pose detection system such as cameras or enhancers on the vehicle to detect poses as the vehicle moves through the environment. In some examples, movable portions of a pose detection system may be worn or held by a user. In various examples, some elements of a pose detection system may be statically mounted in the environment while others may be movable through the environment.

During operation, the users 112 interact with content, such as images or videos, displayed within the physical environment 104, such as by moving their bodies including head, torso, hands, arms, legs, or the like. The system 100 captures images of poses and uses the images to generate outputs, either physically or virtually (e.g., in the displayed content), where the output is based on the movement or position of the pose.

The enhancer 110 is generally any type of device that increases the detectability of a pose within the environment 104, either at the time of image capture or after the images have been captured and while the system is analyzing the images. In some examples, an enhancer 110 may be an illuminator 110 that lights a portion of the environment 104, such as the area 118. In other examples, an enhancer 110 may be an ultrasonic emitter, a rangefinder such as a time of flight sensor, a proximity detector, or the like. Combinations of different types of enhancers may be used in conjunction with one another.

In examples where the enhancer is an illuminator 110, the illuminator may illuminate the area 118 to allow a camera 108 to capture information about a pose while being illuminated with a light. In some instances, such as where an increased sensitivity is desired, a field of view of camera 108 may be selected or adjusted to include a single pose, or even portions that include poses such that there may be narrow view cameras 108 and/or enhancers 110, but in other instances, such as where less sensitivity and cost savings are desired, fewer wider view cameras/enhancers may be used.

In instances where the enhancer 110 is an illuminator or light it includes a light source, such as a light emitting diode (LED). In these instances, the enhancer 110 may include a filter positioned between the light source and the area 118 to filter, absorb, block, or redirect light emitted from a light source so that the light does not impact the content and the user experience. For example, some infrared LEDs emit a red glow that can be seen by some users 112 and the filter may block the glow to prevent users 112 from seeing the light source. The filters may include an infrared transmissive material that allows desirable wavelengths of light to pass through, but blocks undesirable wavelengths, such as visible wavelengths. In this manner, the illuminator can illuminate the area 118 with a desired wavelength, while still preventing the users from seeing light emitted from the illuminator.

The enhancers 110 may emit light illuminating an area 118 or areas of the background to increase the visibility of objects to the cameras 108. To this end, the light emitted may be in various wavelengths or ranges, including those that are visible or invisible to the human eye. In some instances, wavelengths that are not perceptible by humans may be selected to avoid the light 122 from interfering with the entertainment effects of the environment or being perceived by the users 112. In some embodiments, the enhancer 110 is a light source that emits light in one or more wavelengths, which may be emitted in a beam or may be diffuse, spread, patterned, or non-coherent as desired. Moreover, light output from enhancer 110 may have uniform intensity, or may be pulse modulated, amplitude modulated, flashed, or implement a pattern useful for a particular application. In some instances, the light 122 is emitted by an enhancer with a beam spread 120 selected such that it overlaps with adjacent light 122 from other enhancers and may overlap the fields of view 124 of the cameras 108. Enhancers 110a-110c may be placed in any suitable location to illuminate an area 118 such that images may be captured by a camera 108. Any suitable number of enhancers 110 may be used, for instance to illuminate the area 118 evenly, or to provide reflections from the users bright enough for the cameras 108 to detect images. In one example, three enhancers may be used with an area 118 accommodating two users 112. The enhancers 110 and/or cameras 108 may be mounted or fixed to the area 118, such as in a vehicle, or they may be stationary in the physical environment 104. In one embodiment, the enhancers 110 emit light in the infrared band so as to be imperceptible by the human eye, e.g., wavelengths above 750 nanometers ("nm"), above 800 nm, above 840 nm, above 850 nm, above 900 nm, at or above 940 nm, or higher.

The camera 108 may be substantially any type of image detector or sensor that detects light at the wavelength emitted by enhancers 110 and generates an electrical signal representing the detected light. Examples of the camera 108 include a charge-coupled device, or a complementary metal oxide semiconductor device that converts photons of light that fall on the image sensor into a digital image including pixels that represent the intensity and/or color of the light incident on the image sensor. The camera 108 may also include optics to zoom or focus on a desired point or area within the physical environment 104.

Figure 1B:
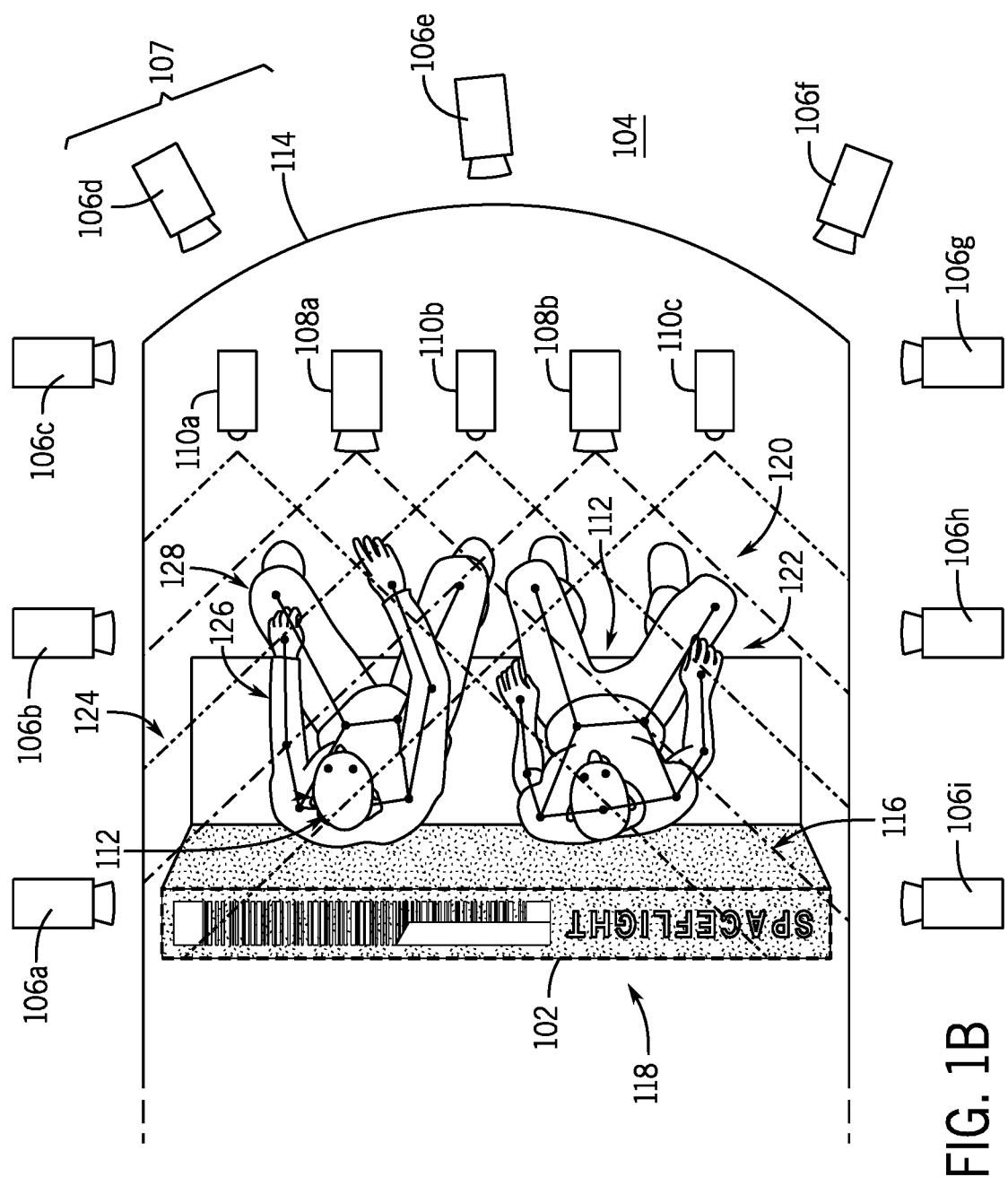
FIG. 1B is a schematic view of a physical environment including the pose detection system of FIG. 1A.

In some embodiments, the cameras 108 have a field of view 124 that captures at least part of a pose (e.g., aimed at the area 118 within the physical environment) and in instances where the system 100 includes multiple cameras 108, the fields of view 124 of the cameras 108 may overlap one another, such as cameras 108a and 108b as shown for example in FIG. 1B. Such overlapping fields of view 124 may enable the pose detection system 100 to generate virtual poses 126 in three dimensions, provide more accurate or precise detection of the physical pose 128, provide redundancy in the case of a failure or obstruction for a particular camera, and enhance detectable areas (e.g., left and right hands). In some examples, the camera 108 may have a field of view 124 wide enough to capture images of all poses within the area 118. A camera 108 may be provided at any suitable angle with respect to the area 118. For example, a camera 108 may be above, in front of, to the side of, below, behind, or combinations of these with respect to the area 118. Conversely, the field of view 124 and position of camera 108 may be selected to prevent certain features in or near area 118 from being visible to camera 108. For example, it may be desirable to not capture images of faces or other images that do not convey pose information.

Figure 8:
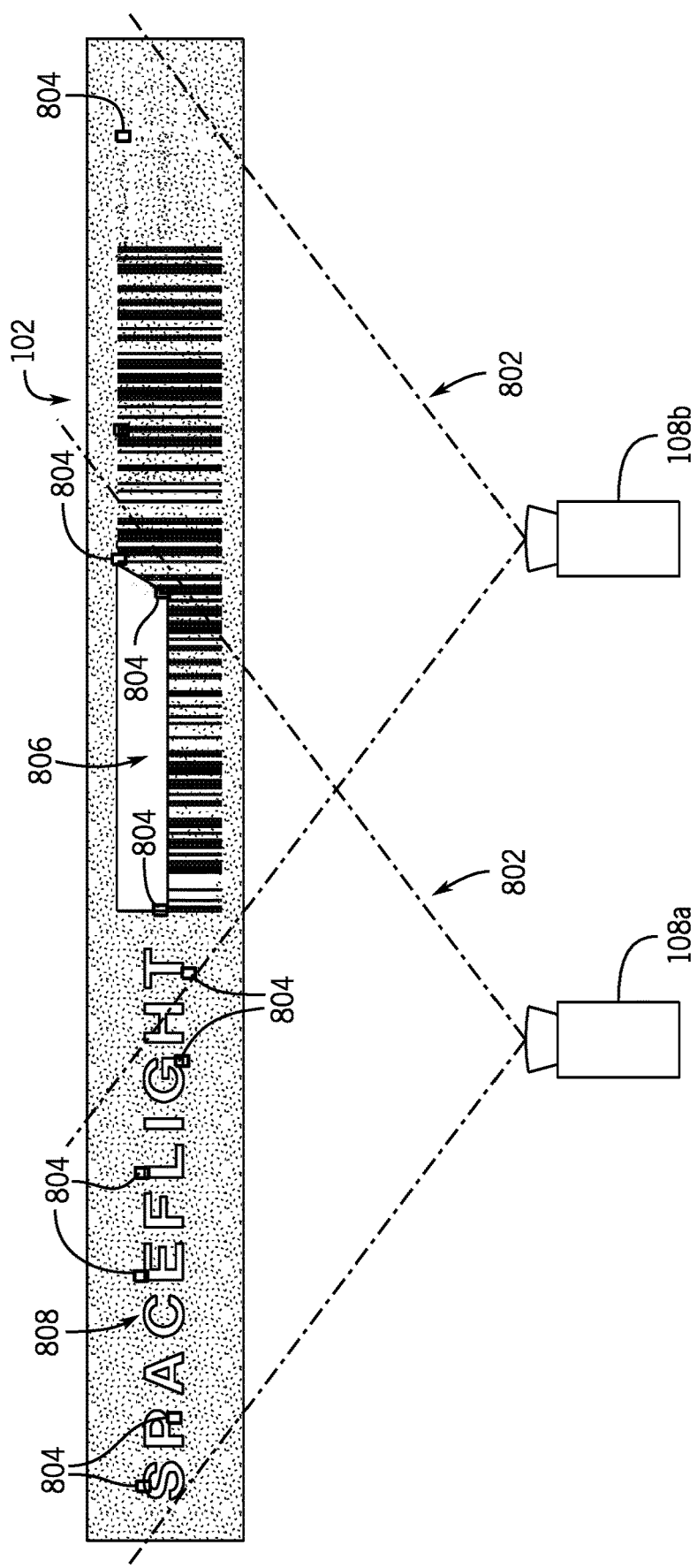
FIG. 8 is a schematic view of an example of a calibration target for use with the calibration method of FIG. 7.

The area 118 may be any area, location, or structure in the environment 104 adapted to accept a user 112. For example, an area 118 may be a seat, chair, a portion of a floor or wall, a portion of a vehicle (e.g., ride vehicle), or other supports to support a user 112, or the like. The area 118 may secure a user such as with a shoulder harness, lap bar, seatbelt, or the like. The area 118 may have a background 116, such as a back of a vehicle structure or the like, that optionally may define a contrast between the area 118 and the users 112, e.g., the background 116 may be colored, textured, or otherwise configured to contrast from the users 112 in brightness or color of light reflected by the respective user 112. For example, as shown in FIG. 1 and FIG. 8, the area 118 has a background 116 darker in color than the users 112, such as being a navy blue, black, or other darker monotone color different from user clothing colors. In other examples, a background may use a chroma key color not normally associated with a user 112, e.g., a green screen. In other examples, the background may have a pattern or print helping to increase the contrast between the users 112 and the background 116. In some embodiments, the background 116 may be made of a material or include a coating or other layer (e.g., paint) absorbing certain frequencies of light more readily reflected by the users 112. For example, some plastics, fabric, wood, brick, stone, or glass absorb infrared light, while a user's skin generally reflects infrared light. User supports may, similarly to the background, also be colored or treated to contrast relative to the users 112. Such contrast may assist the detection system 100 to more easily differentiate between the users 112 and the background, allowing more accurate or faster detection of a pose. The contrast may also assist the pose detection system 100 to detect the poses 128 regardless of the color of their complexion, or the clothes they are wearing.

Figure 2A:
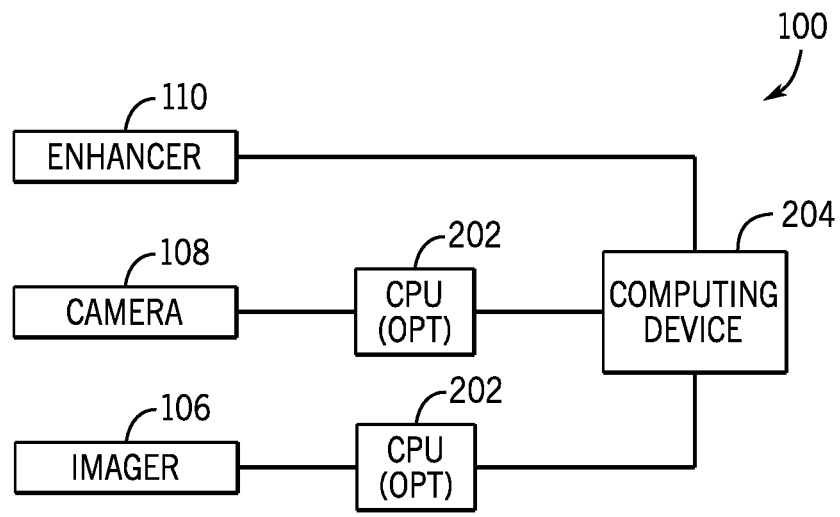
FIG. 2A is a simplified block diagram of the pose detection system of FIGS. 1A and 1B.
Figure 2B:
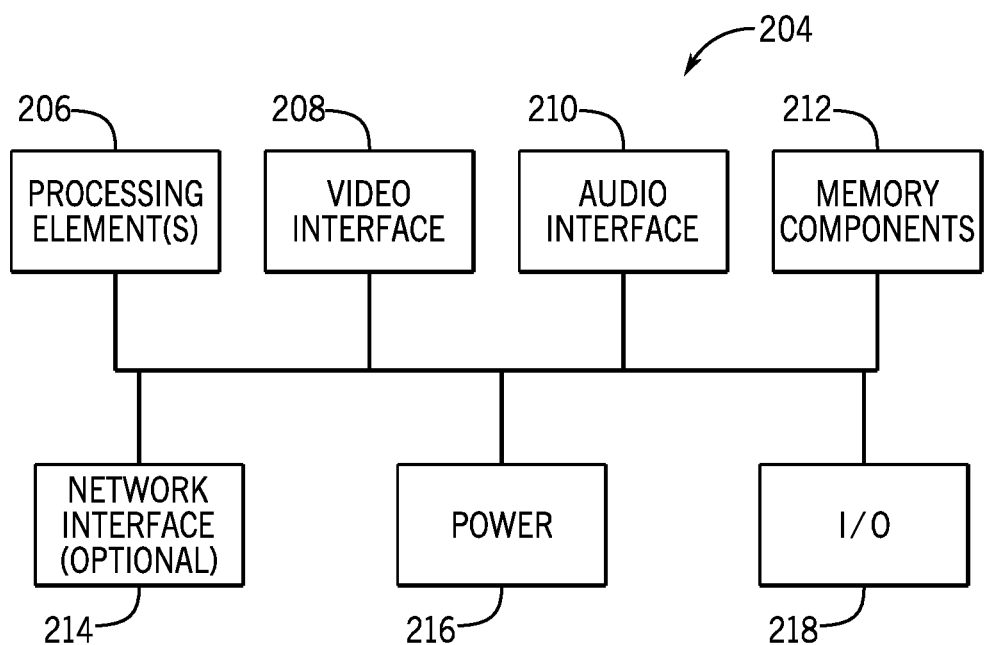
FIG. 2B is a simplified block diagram of a computing device for use with the system of FIGS. 1A and 1B.
Figure 3A:
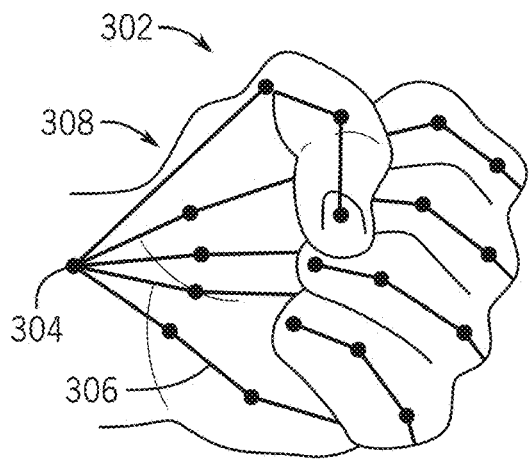
FIG. 3A shows a first gesture of a hand with joint objects and bone objects as detected by the pose detection system of FIGS. 1A and 1B.
Figure 3B:
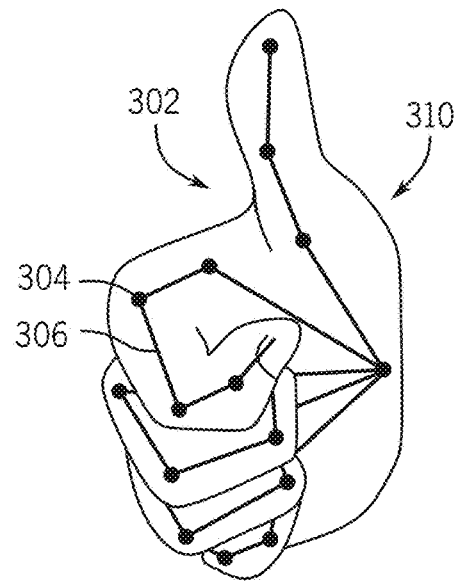
FIG. 3B shows a second gesture of a hand with joint objects and bone objects as detected by the pose detection system of FIGS. 1A and 1B.
Figure 3C:
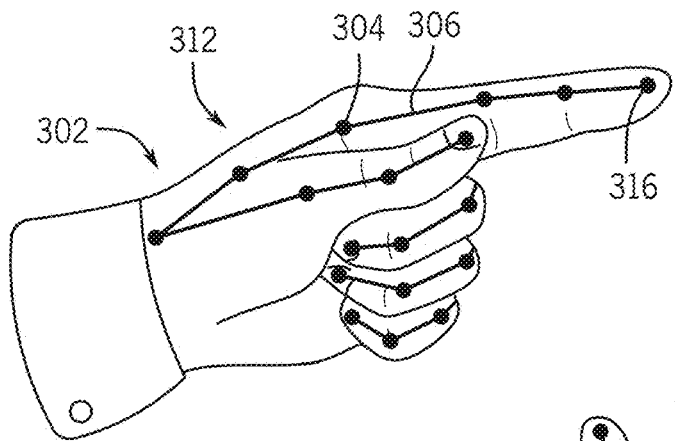
FIG. 3C shows a third gesture of a hand with joint objects and bone objects as detected by the pose detection system of FIGS. 1A and 1B.
Figure 3D:
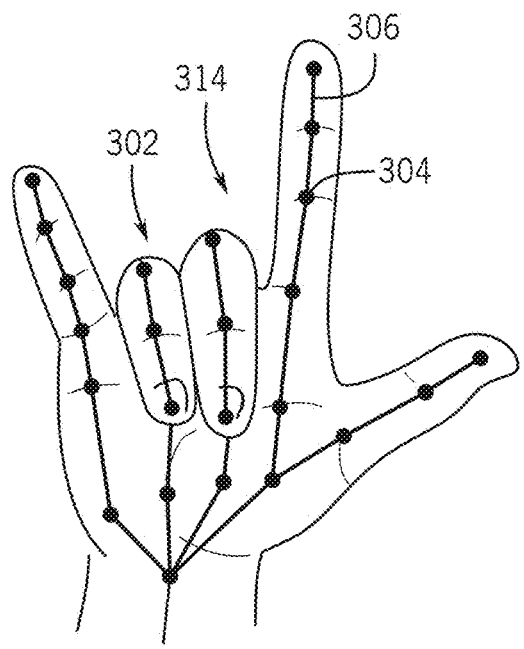
FIG. 3D shows a fourth gesture of a hand with joint objects and bone objects as detected by the pose detection system of FIGS. 1A and 1B.

The cameras 108, enhancers 110, and/or imagers 107 may be in communication with one another, as shown for example in FIG. 2A, via a computing device 204, which may be a server, distributed computer, cloud resource, laptop, tablet computer, smart phone, or the like. FIG. 2B illustrates a simplified block diagram for the computing device 204. The computing device 204 may include one or more processing elements 206, a video interface 208, an audio interface 210, one or more memory components 212, a network interface 214 (optional), a power supply 216, and an input/output ("I/O") interface 218. The various components may be in direct or indirect communication with one another, such as via one or more system buses, contact traces, wiring, or via wireless mechanisms.

The one or more processing elements 206 may be substantially any electronic device capable of processing, receiving, and/or transmitting instructions. For example, the processing element 206 may be a microprocessor, microcomputer, microcontroller, field programmable gate array, an application specific integrated circuit, graphics processing unit, or the like. The processing element 206 may include one or more processing elements or modules that may or may not be in communication with one another. For example, a first processing element may control a first set of components of the computing device 204 and a second processing element may control a second set of components of the computing device 204 where the first and second processing elements may or may not be in communication with each other. Relatedly, the processing elements 206 may be configured to execute one or more instructions in parallel, locally, and/or across the network, such as through cloud computing resources.

The video interface 208 provides an input/output mechanism for the computing device 204 to transmit visual content to one or more of the imagers 107. The video interface 208 may transmit visual content (e.g., images, graphical user interfaces, videos, notifications, virtual environments, and objects, and the like) to the imagers 107, and in certain instances may also act to receive user 112 input in addition to a pose (e.g., via a touch screen or the like).

The audio interface 210 provides an input/output mechanism for the computing device 204 to transmit audio information to other components of the pose detection system 100. The audio interface 210 may transmit audio content (e.g., a soundtrack or dialog that accompanies the visual content) and it may also transmit sounds or alerts or auditory effects.

The memory components 212 may be a computer readable medium operable to store electronic data that may be utilized by the computing device 204, such as audio files, video files, document files, programming instructions, position information, motion information, camera 108 calibration information, authentication information, configuration information, and the like. The memory components 212 may be, for example, non-volatile storage, a magnetic storage medium, optical storage medium, magneto-optical storage medium, read only memory, random access memory, erasable programmable memory, flash memory, or a combination of one or more types of memory components.

The network interface 214 is optional and can receive and transmit data to and from a network to the various devices (e.g., an imager 107, an enhancer 110, or a camera 108) in the pose detection system 100. The network interface 214 may transmit and send data to the network directly or indirectly. For example, the network interface 214 may transmit data to and from other computing devices through a network which may be a cellular, satellite, or other wireless network (Wi-Fi, WiMAX, Bluetooth) or a wired network (e.g., Ethernet, Ethernet Control Automation Technology (EtherCAT), Controller Area Network bus (CAN bus), Modbus, or the like), or a combination thereof. In some embodiments, the network interface 214 may also include various modules, such as an API interfacing and translating requests across the network to other elements of the system 100.

The computing device 204 may also include a power supply 216. The power supply 216 provides power to various components of the computing device 204. The power supply 216 may include one or more rechargeable, disposable, or hardwire sources, e.g., batteries, power cord, AC/DC rectifier, DC/DC converter, or the like. Additionally, the power supply 216 may include one or more types of connectors or components that provide different types of power to the computing device 204. In some embodiments, the power supply 216 may include a connector (such as a universal serial bus) that provides power to the computer or batteries within the computer and also transmits data to and from the device to other devices.

The input/output ("I/O") interface 218 allows the computing device 204 to receive input from a user such as an operator of the pose detection system 100 and provide output to the user. For example, the input/output ("I/O") interface 218 may include a capacitive touch screen, keyboard, mouse, pedal, stylus, hotkey, button, joystick, or the like. The type of devices that interact via the input/output ("I/O") interface 218 may be varied as desired.

The computing device 204 may activate the enhancers 110. In examples where the enhancer is an illuminator the computing device may adjust the intensity, modulation, or color of light emitted. The computing device 204 receives images of the physical environment 104 from a camera 108 and may cause an imager 107 to display images of the virtual environment. Any or all of the cameras 108 and/or imagers 107 may have a dedicated graphics processor 202, such as a GPU to assist in processing input or output image data. In some examples, cameras 108 and/or imagers 107 may share a GPU, or may use no GPU.

Optionally, the pose detection system 100 may include one or more imagers 107 that may generally be substantially any type of device that displays a visual image. In some examples, an imager 107 may include a projector 106 that emits light toward a display surface 114, such as a screen, scrim, wall, mannequin, or other object that receives light from the projector 106 to generate an image. Some examples of projectors 106 include digital light processors, lasers, or LCD. In some examples, a display surface 114 may reflect light emitted by the projector 106 toward a user 112. In other examples, a display surface 114 may transmit light emitted by the projector 106 through, toward the user 112, such as a rear projection screen. In some examples, a display surface may reflect and transmit light. In some examples an imager 107 may be a light, such as a stage or theatrical light. In some examples, an imager 107 may be a display or monitor such as a cathode ray tube, plasma, LCD, or LED display. Such displays may generate and display visual images without a separate display surface, or with an internal display surface that generates images. An imager 107 may be mounted to the physical environment 104, such as a wall, floor, or similar structure. The imagers be mounted to a vehicle or other mobile object. Some imagers 107 may be included in a headset configured to be worn by a user 112, such as a virtual reality or 3D headset.

In some examples, the pose detection system 100 may allow a user 112 to interact with a virtual environment. For example, the pose detection system 100 may display a virtual environment, with virtual objects, on a display surface 114. In response to detecting a physical pose 128, the pose detection system 100 determines a virtual pose 126, models the position and movements of the physical pose 128, and uses the virtual pose 126 to interact with virtual objects.

The pose detection system 100 detects the physical pose 128 of various parts of a user's 112 figure. For example, as shown in FIG. 1, the pose detection system 100 may detect the pose of the head, torso, or major limbs (e.g., arms or legs). The pose detection system 100 may also detect the pose in finer detail, such as the pose of a hand 302, foot, finger, and toe. FIG. 3A-FIG. 3D show examples of physical hand poses that may be detected by the pose detection system 100. For example, in FIG. 3A, a first gesture 308 is shown; in FIG. 3B a thumbs-up gesture 310 is shown; in FIG. 3C a pointing gesture 312 is shown; and in FIG. 3D, a character gesture 314 associated with a character or virtual characteristic in the virtual environment is shown. Any other gesture that may be made by a human may be detected, as desired. After the pose detection system 100 detects a gesture or predetermined set of movements or positions, the system may link the gesture with a virtual effect (e.g., an audio or other effect), and output the corresponding effect. For example, if the pose detection system 100 detects a pointing gesture, such as shown for example in FIG. 3C, the system may display a visual effect of an energy beam emanating from the user's hand performing the gesture.

In some examples, the pose detection system may segment a detected image and process just a portion of the image of interest. For example, if the pose detection system is configured to detect hand gestures, the system may prioritize analyzing portions of an image associated with hands, or may analyze only such portions. Such segmentation may have the advantage of saving processing throughput or computing time of a processing element, thereby enabling the use of a lower-powered processing element. Segmentation may allow a processing element to process images from more cameras or process images at a higher frame rate than without segmentation.

Figure 4:
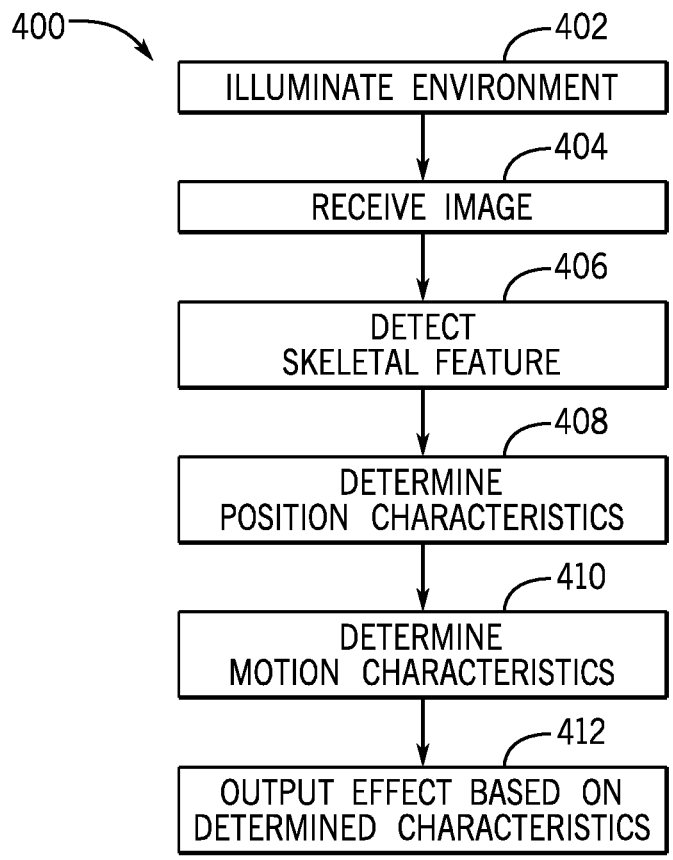
FIG. 4 is a flow chart illustrating a method for detecting a pose, and rendering an effect based on the pose, using the pose detection system of FIGS. 1A and 1B.

FIG. 4 shows a method 400 of detecting a pose and outputting a virtual effect using the pose detection system 100. The operations of the method 400 may be executed in an order other than as shown in FIG. 4.

The method 400 may begin in operation 402 and the pose detection system 100 actuates the one or more enhancers 110 to increase the detectability of a physical pose 128 within the environment 104. For example, one or more enhancers may illuminate the physical environment 104, e.g., activate a light 122 so as to reflect light off of the area 118 and the users 112. Individual enhancers 110 may be turned on at different times or all enhancers 110 in the physical environment 104 may be turned on at substantially the same time, the actuation of the enhancers 110 may depend on the experience, user movement, or the like. The intensity of the light from the enhancers 110 may be adjusted to provide desired illumination of a portion or all of the physical environment 104, such as the area 118. For example, illumination levels may be monitored by one or more cameras 108 and adjusted based on illumination detected by the cameras 108. In one example, the computing device 204 may control the on/off state or intensity of the enhancers 110, either directly, through a network, a controller, or other suitable device. In other examples, the enhancers 110 may be turned on manually such as with a switch, or may be powered any time power is applied to a portion of the physical environment 104. For example, when the area 118 is a vehicle, such as for use in a theme park ride or attraction, the enhancers 110 may be powered any time the ride is powered or as the vehicle approaches certain waypoints that correspond to select content presentation and user interaction areas.

In operation 404 the computing device 204 receives an image of the physical environment 104, including the area 118, captured by a camera 108. The captured image typically includes the user 112 and captures the position or physical pose 128 at the moment the image was captured. More than one camera 108 may capture an image of the area 118 from different locations or angles at substantially the same time, e.g., the cameras may be synchronized to capture images at the same points in time but at different locations, such that images from the cameras will correspond to different views of area 118 at the same point in time. For example, one camera 108 may be positioned to the left of the user 112 and a second camera positioned to the right of the user 112. Both such cameras 108 may capture images of a pose of the head and torso at the same time, but from the left and right positions, respectively.

Depending on the number of users, desired sensitivity, detected poses, etc., additional cameras 108 may be used to capture images of the same features of the physical pose 128 at similar points in time or at alternating points in time from one another. For example, the physical environment 104 may include two cameras 108*a* and 108*b* that capture images the area 118 at substantially the same time, but from different positions. In some examples, the cameras 108*a* and 108*b* may be synchronized, such as with a time signal, such that images are captured at substantially the same time by each camera 108*a* and 108*b*. In other examples, cameras 108*a* and 108*b* may be operated in a sequential manner capturing frames one after the other in sequence, which operation may be controlled by a time signal. Such time signals may be provided by the computing device 204 or other processing element. Images captured by a camera 108 may be transmitted for further processing to the computing device 204 or another processing element, by any suitable method, such as via a wired or wireless network, or dedicated wires, fiber optics or cabling.

In operation 406 the computing device 204 or other processing element analyzes the captured images to detect a skeletal feature of the physical pose 128. The computing device 204 uses the captured images to detect the position of the bones and joints of the physical pose 128. In some examples, the computing device 204 may detect these portions of the physical pose 128 in the captured images using machine learning ("ML") or artificial intelligence ("AI") algorithms that have been trained to recognize such features, such as a convolutional neural network. In some examples, the images are individually analyzed to detect skeletal features using AI or ML algorithms. For example, an AI or ML algorithms may be trained to recognize and/or classify joints, bones, eyes, the head, shoulders, the neck, or other features, as well as poses of those features. In some examples, an AI may be trained by feeding it training images of physical poses 128 where the locations of bone and/or joint objects have already been identified. Training images may be images in which points of significance (e.g. joints and/or bones) have been labeled. The AI may learn from the training images to detect portions or pixels of an image associated with bone or joint objects. The training images may be adapted or varied for detecting different skeletal features. For example, there may be separate training sets provided for whole body, upper body, lower body, arms, feet, hands, or the like. The training images may include images of physical poses 128 enhanced by an enhancer 110. The training images may have backgrounds 116 that contrast in shape, color, luminosity, pattern, or other characteristics from users 112. For example, if the AI is trained on images with dark backgrounds and relatively brightly lit users, the AI may ignore dark pixels of images and focus on brightly lit areas to detect the pose.

Upon identifying a feature of the physical pose 128 associated with a bone, the pose detection system 100 may generate a bone object 306 in the virtual environment representing the physical bone in the physical environment 104. The pose detection system 100 may detect joints between bones, such as a knuckle, knee, or the like. The pose detection system 100 may generate a joint object 304 connecting two or more bone objects 306. Bone objects 306 connected to a common joint object 304 may move, twist, pivot, or rotate about the joint object 304 with respect to one another. The pose detection system 100 may generate a terminal object 316 at the end of a bone object 306, representing an end of a limb, such as a fingertip, foot, or hand 302. The various bone objects 306, joint objects 304, and terminal objects 316 collectively represent the virtual pose 126. The system may assign bone objects and/or joint objects to a structure, e.g. a virtual skeleton.

The pose detection system 100 may capture a first image from a camera 108, such as in operation 404 and determine a virtual pose 126 of major joints and features of the figure of the user 112, such as shown for example, in FIG. 1 in operation 406. The pose detection system 100 may capture a second image from a camera 108, such as in operation 404. Additionally or alternatively, the pose detection system may capture images of a physical pose 128 from different positions and/or angles at substantially the same time using more than one camera. The pose detection system may use a second image (either captured sequentially with the same camera and/or captured at the same time with more than one camera) to determine a virtual pose with more accuracy and/or determine virtual poses of smaller parts of the body (e.g., hands, wrists, fingers, feet, or toes). Portions of the AI trained with training images corresponding to certain skeletal features may be selectively activated when a relevant feature is to be detected. For example, if the skeletal feature of interest is a hand, the pose detection system may activate only the portion of the AI trained to detect hands. Alternately or additionally, the pose detection system 100 may determine a virtual pose 126 in greater detail. For example, the pose detection system 100 may detect a virtual pose 126 of the head, arms, eyes and torso in a first image and then, preferably before the user 112 moves a significant amount, capture another image and determine the pose of the hand and fingers, as shown for example in FIG. 3A-FIG. 3D. In some examples, the pose detection system 100 may detect bone and/or joint objects from a single frame, or from two or more frames captured at different times. In instances where multiple frames may be used, the method may return to the image capture operations to capture additional images as needed before proceeding to other operations.

In operation 408 the computing device 204 or other processing element determines position characteristics of a joint object 304 and/or bone object 306. The pose detection system 100 may define a coordinate system with respect to an origin in the physical environment 104. For example, the origin may be a corner or other suitable location of the area 118. The coordinate system may include one or more axes, two or more of which may be mutually orthogonal, such as a Cartesian coordinate system. Other coordinate systems, such as polar coordinate systems may be defined as well, such as may be useful for specifying a distance and direction of a body feature relative to a camera 108. The computing device 204 may translate coordinates between suitable coordinate systems as desired.

In some examples, when a bone object 306 or joint object 304 is detected in images captured at substantially the same time by different cameras 108, the computing device 204 may use triangulation techniques, given known coordinates and orientations of the cameras 108 within the physical environment 104, to locate the joint objects 304 and/or bone objects 306 in three dimensional ("3D") space. In some examples, after skeletal features are detected in individual images, such as in operation 404, results from each camera are then combined to reconstruct the locations of physical poses 128. For example, returning to FIG. 1B, the camera 108a may capture an image of a left hand from a point of view to the left of the hand. The camera 108b may capture an image of the same left hand, but from a point of view to the right of the hand. The two images from the cameras 108a and 108b may be captured at substantially the same time when the hand is in the same location in the physical environment 104 in both images. In operation 404, the pose detection system 100 may individually detect bone and/or joint objects in each of the two images from the cameras 108a and 108b. The system 100 may recognize that the bone and/or joint objects detected in the two images from the cameras 108a and 108b are images of the same bones or joints taken from different points of view. The pose detection system 100 may, for example in operation 408, combine the results of the detection of the bone and/or joint objects in each of the images to reconstruct the location of the bone and/or joint objects in 3D space. Capturing two or more images of a physical pose 128 at substantially the same time, from different cameras 108 with different points of view has the advantage over prior systems of enabling the pose detection system 100 to detect physical poses 128 in three dimensions. Likewise, when position information on a physical pose 128 is detected in three dimensions, three dimensional movement may be detected as well. Generally, the more cameras 108 that detect a particular object, the more accurately the 3D position and/or motion of the object can be placed.

The positions of the bone objects 306 and joint objects 304 may be stored in memory 212 in the form of a position vector that represents coordinates of an aspect of the bone object 306 or joint object 304 within the coordinate system. For example, the computing device 204 may have determined a bone object corresponding to a humerus bone in the arm. The computing device 204 may determine a position of the proximal aspect of the humerus (the end of the humerus connected to the shoulder) in the coordinate system and store that position in a vector with values representing the position of the proximal aspect with respect to an axis of the coordinate system. For example, the vector may contain x, y, and z values with respect to mutually orthogonal x, y, and z axes of the coordinate system. Likewise, the computing device 204 may determine the position of the distal aspect of the humerus (the end at the elbow) and store that location in the same vector or another vector as the proximal aspect. Similarly, the computing device 204 may determine a joint object associated with an elbow and may store the position of the elbow joint object in a similar vector. The coordinates of the position of the elbow joint object may be substantially the same as those of the distal aspect of the humerus.

In operation 410 the computing device 204 determines motion characteristics of joint objects 304 and/or bone objects 306, which can be used to determine motion characteristics for the virtual pose 126. In some examples, the pose detection system 100 may detect movement between two frames captured at different times, separated by a known or predetermined amount of time. For example, a camera 108 may operate at a frame rate, capturing a number of images per second. In one example, a camera 108 captures images at a rate of 60 frames per second ("FPS") or higher. In other examples, a camera 108 captures images at a rate of 100 FPS or higher. The pose detection system 100 may calculate motion based on the movement of bone objects 306 or joint objects 304 between such frames. For example, if the time between a first frame and a second frame is known or predetermined, and a change in position of a bone object 306 or joint object 304 is detected between the two frames, the computing device 204 may determine a speed or velocity (velocity including a speed and a direction) of the bone object 306 or joint object 304. Likewise, the pose detection system 100 may determine changes in speed and/or velocity of a bone object 306 or joint object 304. For example, if the computing device 204 determines a velocity of a bone object 306, as described above, between two successive frames captured by a camera 108, and determines another velocity between another two successive frames (one of which may be a common frame with the first velocity determination), the computing device 204 can use the change between those velocities and the time between the frames to determine an acceleration, including a change in direction, speed, and/or velocity, of the bone object 306 and/or joint object 304. Similarly, the pose detection system 100 may determine changes in acceleration. The computing device 204 may represent such motion characteristics of the bone objects 306 and joint objects 304 of the virtual pose 126 as vectors in 2D or 3D space to represent the motion of the physical pose 128. The pose detection system 100 may detect direction of movement of the physical pose 128, based on determining the location or motion of the shoulder, the bones of the arm, the wrist, and the fingers. In some examples of the method 400, the operation 410 may be optional such that motion characteristics of bone and/or joint objects are not determined or are ignored.

In either or both of operation 408 and operation 410 the computing device 204 may use the motion characteristics and/or position characteristics, to determine gestures or momentum of the physical pose 128. For example, a rapid acceleration of a finger where the finger un-curls and is straight, may be determined to be a flick gesture. The pose detection system 100 may detect any number of poses for which it has been trained, for example, the first gesture 308, thumbs-up gesture 310, the pointing gesture 312, the character gesture 314, or the like. The pose detection system 100 may determine compound poses that combine two or more poses, such as a user 112 with crossed arms and also using a pointing gesture 312 like in FIG. 3C, or a user 112 extending an arm out in a direction and making a pose associated with a character, such as the character gesture 314 in FIG. 3D.

The pose detection system 100 may predict a future motion and/or position of a physical pose 128 based on a current or previous motion and/or position of the physical pose 128 and generate a corresponding predicted motion or position characteristic. For example, if the system 100 detects that a user 112 begins to move an arm at a speed and/or direction consistent with the arm extending away from the user 112, the system 100 may predict the continuation or completion of the movement (e.g., the arm being fully extended from the user 112). The system 100 may use a detected a motion or position characteristic of one part of a physical pose 128 to predict a motion or position characteristic of another part of a physical pose 128. For example, the system 100 may detect a torso movement indicating the user 112 may be preparing to extend an arm out and may generate a predicted motion or position characteristic related to the arm. The system 100 may compare a predicted motion and/or position characteristic to an actual motion and/or position characteristic and compare errors therebetween to learn a user's behavior. Such learning function may allow the system 100 to more accurately predict motion and/or position of physical pose 128 over time. The system 100 may store predicted motion and/or position characteristics using methods similar to those used for detected position and motion characteristics.

In operation 412 the computing device 204 may output an effect or content based on determined characteristics, such as the position and/or motion characteristics. For example, the computing device 204 may have determined that the user 112 is making a gesture associated with a virtual effect such as shooting an energy beam out of the user's hand 302, and may display a corresponding virtual effect via one or more imagers 107. In another example, the user 112 may make a gesture corresponding to a virtual effect of holding up a virtual shield, and the computing device 204 may display such an effect. In another example, the pose detection system 100 may display a virtual ball via an imager 107. The user 112 may make a gesture as if to pick up the ball. The pose detection system 100 may detect the picking up motion and translate that to motion of the virtual pose 126, and show the user 112, or an avatar or character representing the user 112 picking up the virtual ball. Similarly, the user 112 may then make a motion as if to throw the virtual ball and the pose detection system 100 may detect the throwing motion and display the virtual ball as if it were thrown according to the physical pose 128 as detected by the pose detection system 100. Additionally or alternately, the system 100 may output an effect based on a predicted motion and/or position characteristic. Continuing the example of the user extending an arm out, described above, the system may use the predicted motion or position information to display a visual effect of an energy beam emanating from a user's arm just as the arm reaches a full extension from the user's body, such that the output effects may be substantially simultaneous with the user's motion, generating a more realistic effect. In other examples, the pose detection system 100 may activate other outputs corresponding to motion or position characteristics.

Figure 5A:
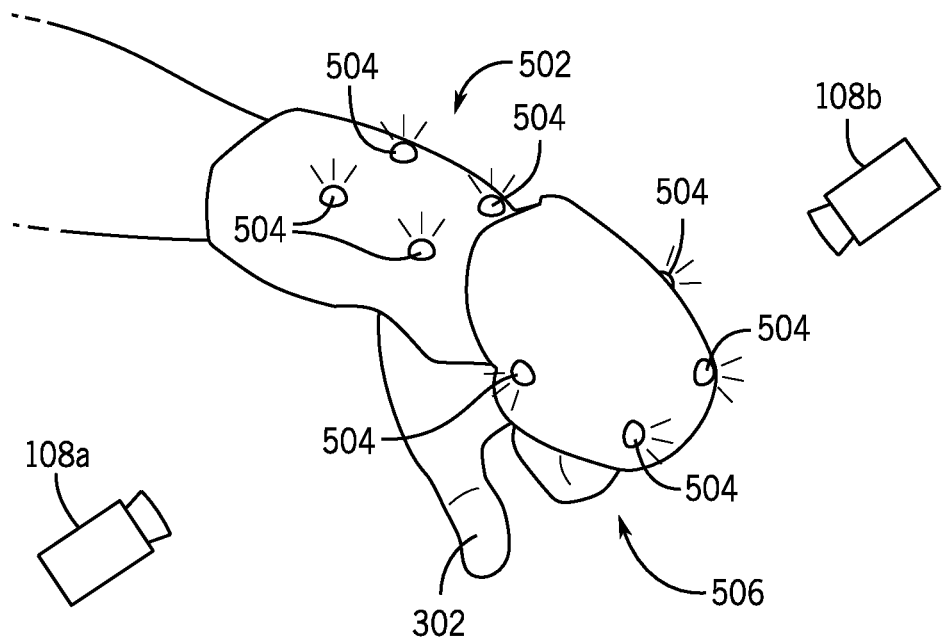
FIG. 5A is a perspective view of a wearable article for use with the pose detection system of FIGS. 1A and 1B.

FIG. 5A illustrates a wearable article for use with a pose detection system 100. The wearable article 502 may be used to enhance gameplay or otherwise increase the user experience, such as by imbuing the user 112 with a virtual characteristic or ability, or may identify the user 112 as a virtual character or avatar.

The wearable article 502 shown in FIG. 5A is a gauntlet; other wearable articles or accessories such as a hat, jacket, prosthesis, pants, shoes, ring, diadem, crown, mask, glasses, or helmet are contemplated. Additionally, articles that may be held or manipulated by a user, but are not typically worn, such as a wand, staff, tool, and the like, are contemplated. The wearable article 502 may have distinctive physical features such as size, color, pattern, or shape that may embody creative aspects of a character or avatar associated with the wearable article 502 and optionally the distinctive physical features may be identifiable by the pose detection system 100.

Figure 5B:
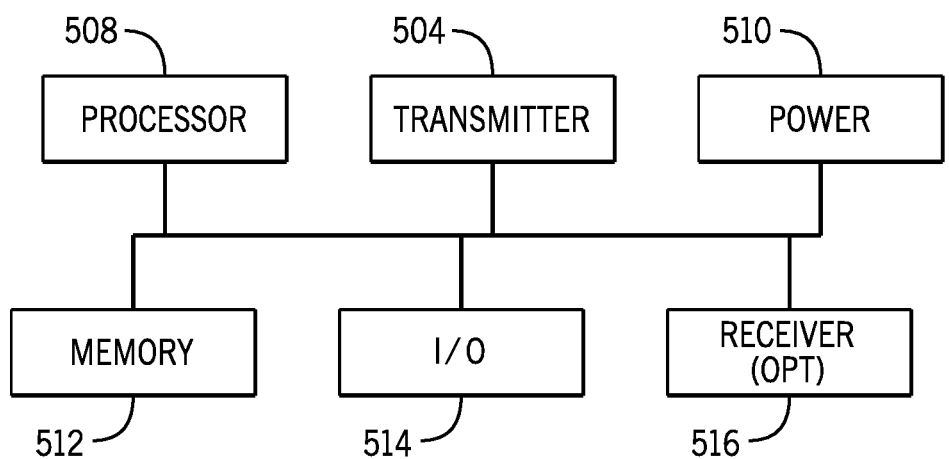
FIG. 5B is a simplified block diagram of the wearable article of FIG. 5A.

FIG. 5B shows a simplified block diagram of components of the wearable article 502. The wearable article 502 includes a processing element 508, memory 512, and optionally power 510 that may be as described with respect to the processing element 206, memory 212, and power supply 216, respectively. Such descriptions are not repeated here, for the sake of brevity.

The wearable article 502 includes a transmitter 504 and may include more than one transmitter 504. The transmitter may be any device that can send a signal detectable by a camera 108 or other component of the pose detection system 100. For example, the transmitter 504 may be a light emitter, such as an LED, a radio frequency, or ultrasonic emitter. In instances where the transmitter 504 is a light source, it may emit light invisible to the human eye, which may act as an enhancer 110 within the system 100. Including multiple transmitters 504 in the wearable article 502 may aid the pose detection system 100 to receive information from one transmitter 504 even if another transmitter is obscured. Additionally, providing multiple transmitters 504 may aid the pose detection system 100 to determine position characteristics of the wearable article 502. For example, the pose detection system 100 may triangulate multiple points on the wearable article 502 based on information received from the transmitters 504.

Optionally, the wearable article 502 may include a receiver 516. The receiver may be an optical detector that detects optical signals sent by the pose detection system 100. For example, a message, authorization signals, commands, or other information can be encoded into light 122 emitted by an enhancer 110 or another type of emitter in the physical environment 104. The receiver 516 may detect such information and the processing element 508 may execute in instruction based on that information. The receiver 516 may also be a receiver adapted to receive radio signals, sounds, or other types of wired or wireless communication. In some examples, a receiver 516 may be combined with a transmitter 504. For example, an LED and phototransistor may be included in the same casing or package and be capable of transmitting and/or receiving information.

The wearable article may optionally include an I/O interface 514. The I/O interface 514 may allow a user 112 to obtain or purchase an additional virtual characteristic, ability, or power. Continuing the example of the wearable article imbuing the user 112 with the ability to shoot a virtual energy beam, the user 112 may purchase an upgrade cartridge that communicates to the wearable article 502 via the upgrade interface 514 to allow the user 112 to additionally shoot virtual lightning from the user's hands. In other examples, an upgrade instruction may be transmitted to the wearable article 502 via the receiver 516.

Figure 6:
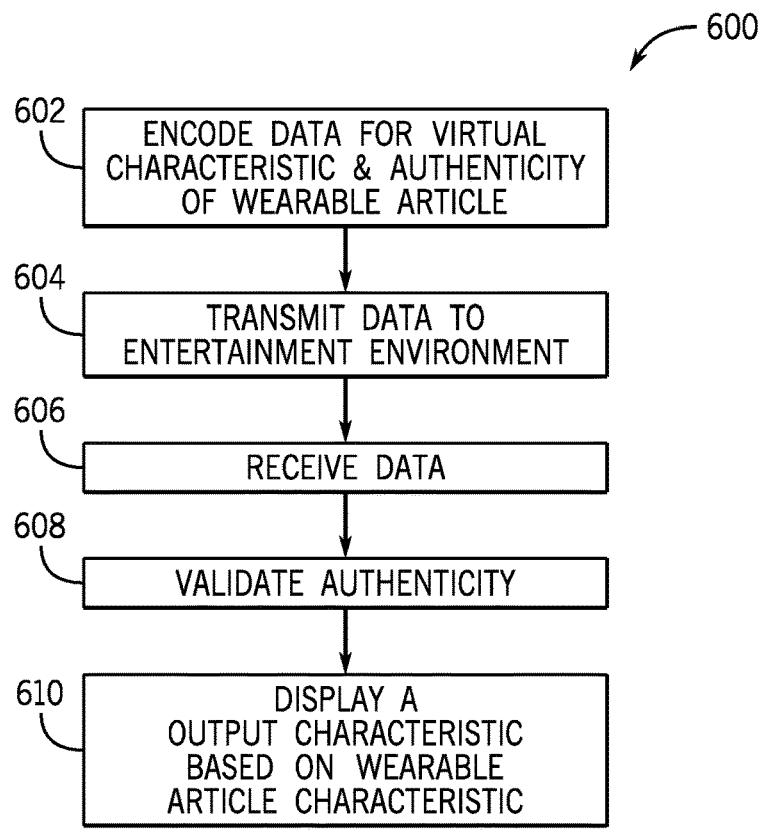
FIG. 6 is a flow chart illustrating a method for augmenting a user experience with the wearable article of FIG. 5A

FIG. 6 shows a method 600 of using a wearable article 502 with the pose detection system 100 to enhance gameplay or otherwise increase the user experience. The operations of method 600 may be executed in an order other than that shown in FIG. 6.

The method 600 may begin in operation 602 and the processing element 508 encodes data for a virtual characteristic and/or authenticity of the wearable article 502. The processing element 508 may encode such data to be outputted by the transmitter 504. Such data may be encoded when the wearable article 502 is manufactured. In some examples, the data may be stored in a read-only memory 512, such that the data cannot easily be over-written, deleted, or altered. In other examples, portions of the data may be alterable (e.g., stored in read/write memory) while other portions may be unalterable (e.g., stored in read-only memory). For example, data associated with a virtual characteristic may be alterable, such as to give the wearable article 502 different or additional virtual characteristics, while data related to authenticity may be read-only. Such data may include information indicating an avatar or virtual characteristic associated with the wearable article 502. For example, the processing element 508 may convert data such as alphanumeric information into a series of electronic pulses. The electronic pulses may be communicated to a transmitter 504 in the wearable article 502.

Additionally or alternately, the processing element 508 may encode data related to the authenticity of the wearable article 502. For example, the processing element 508 may encode a serial number, time-based authentication code, authorized geographic area for use (e.g., acceptable for use in North America), a public or private encryption key, pseudorandom code, one-time use code, a code associated with a challenge-response system, two factor authentication code, or other suitable authentication information. For example, such a wearable article 502 may be subject to counterfeiting and such authentication codes may be difficult for counterfeiters to reproduce. It may be desirable to reduce counterfeiting to ensure a quality user experience, safety, or protect revenue associated with sales of the wearable article 502 or additional virtual characteristics.

In operation 604 the transmitter 504 converts the data encoded in operation 602 to a pose detection system 100 for use in a game or virtual environment. For example, the transmitter may blink with a pattern that a camera 108 or other receiver in the pose detection system 100 can receive and that the computing device 204 may interpret. The transmitter 504 may transmit the information for example by modulating the width of an on/off pulse (pulse width modulation), modulating the frequency of on/off pulses (frequency modulation), or modulate the brightness of on/off pulses (amplitude modulation), or other suitable methods. The transmitter 504 may transmit information related to the authenticity of the wearable article 502. Similarly, in the case of radio transmitters, the transmitter 504 may transmit the encoded data via frequency, pulse, or amplitude modulation or other suitable techniques.

In operation 606 the pose detection system 100 receives the data transmitted in operation 604. The pose detection system 100 may detect the signal transmitted in operation 604 by any suitable method or device complementary to the transmitter 504 technology used. For example, the pose detection system 100 may use a receiver similar to the receiver 516 that may optionally be included in the wearable article 502. In other examples, the pose detection system 100 may use a camera 108 to receive information transmitted by the wearable article 502.

The pose detection system 100 may additionally, or alternatively, detect a characteristic of the wearable article 502 that can be associated with a predetermined effect or output, such as those tied to a particular character. A characteristic of the wearable article 502 may be detected based on an AI or ML algorithm trained to recognize distinctive features of the wearable article 502, such as color, shape, design, pattern or the like. For example, the pose detection system 100 may capture an image of the wearable article 502 with a camera 108 and transmit that image to the computing device 204 for recognition. Thus, the pose detection system 100 may detect the wearable article 502 even if the wearable article 502 does not have transmitters 504 or power 510.

In operation 608 the pose detection system 100 validates the authenticity of the wearable article 502, which helps to prevent counterfeit or unauthenticated devices from being used with the system 100. In these instances, the authentic wearable article 502 transmits an authentication code to the pose detection system 100 indicating that the wearable article 502 is a genuine article. Such authentication codes may be difficult for counterfeiters to reproduce and may be unique to the device or otherwise include information that allows the article to be checked for authenticity. In some examples, the wearable article 502 may transmit a code such as a serial number that the computing device 204 can compare against a database of known authentic serial numbers. However, such authentication methods may be vulnerable to attack. For example, a counterfeiter may copy a static serial number from an authentic wearable article 502 into counterfeit articles. To thwart such attacks, the wearable article 502 and the pose detection system 100 may use a rolling code algorithm or other cryptographic techniques as appropriate. For example, the wearable article 502 and the computing device 204 may have shared cryptographic pseudo-random number generators. The wearable article 502 may calculate a code using the number generator and transmit the code to the computing device 204, such as via a transmitter 504. The computing device 204 may compare the received code to one that it calculates with its own number generator. If the codes match, the computing device 204 may determine that the wearable article 502 is authentic. The pose detection system 100 may, upon failing to receive an authentication code, or receiving a faulty or expired code, ignore the wearable article 502, notify a ride operator, or take other action. Information transmitted by the transmitter 504 may be combined with distinctive features of the wearable article 502 as detected by AI or ML algorithms to further determine the authenticity of the wearable article 502.

In operation 610 the pose detection system 100 displays an output characteristic based on a virtual characteristic. For example, one wearable article 502 may indicate to the pose detection system 100 that the user 112 should have an avatar of a superhero, a comic book character, or an animated character when effects associated with the user 112 are outputted by the pose detection system 100. Likewise, the wearable article 502 may indicate that the user 112 has the ability to shoot a virtual energy beam from the wrist, based on a pose made by the user 112, such as the character gesture 314 or other gestures.

Figure 7:
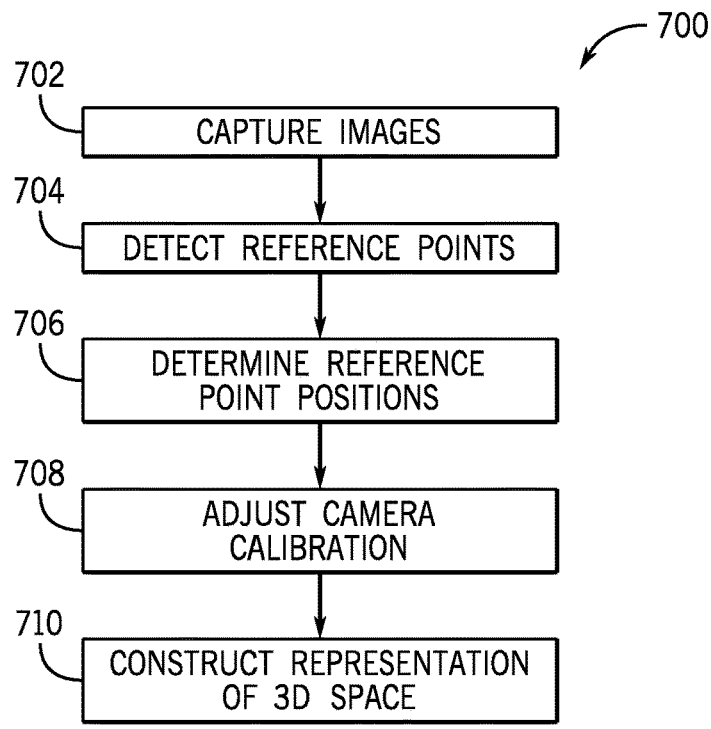
FIG. 7 is a flow chart illustrating a first method of calibration for the pose detection system of FIGS. 1A and 1B.

FIG. 7 illustrates an example of a first method 700 of calibrating cameras 108 of a pose detection system 100. The method 700 is further illustrated by the simplified schematic view of a calibration target 102 and cameras 108 shown for example in FIG. 8. The operations of method 700 may be executed in an order other than that shown in FIG. 8, and with other calibration targets than the one shown.

The method 700 may begin in operation 702 and a camera 108 captures an image of the calibration target 102. The camera 108 has a field of view 802 encompassing at least a portion of the calibration target 102. When more than one camera 108 is used, the fields of view 802 of the cameras 108 may overlap one another.

In operation 704 the computing device 204 detects reference points 804 in an image of the calibration target 102. A calibration target can be any image, surface, or graphic which has a graphical element 806, images of which can be captured by a camera 108, and which has sufficient feature variety to be recognized by a processing element, such as in the computing device 204. For example, a graphical element 806 can be a text element 808 such as a character or letter, areas of varying contrast, a machine readable code (for example, such as the one dimensional barcode shown in FIG. 8, two-dimensional barcodes such as QR codes or the like), corners or intersections of geometric shapes, or the like. Areas of varying contrast may be visible to the human eye, or may be invisible to the human eye, but visible to a camera 108 e.g., by reflecting light emitted by an enhancer 110 in one portion and absorbing light emitted by an enhancer 110 in another portion. The example calibration target 102 shown in FIG. 8 includes at least one reference point 804. An algorithm, such as an AI or ML algorithm executed by the computing device 204 or another processing element may recognize graphical elements 806 as reference points 804. In any operation of the method 700 the calibration target 102 may be illuminated by an enhancer 110, or other light sources.

A calibration target may be a creative graphic that includes creative elements of the physical environment 104 that also serve as graphical elements 806 that the computing device 204 can recognize as reference points 804. For example, the calibration target 102 shown in FIG. 8 is themed for a theme park ride called, "Space Flight". Several letters of the words "Space Flight" are text elements 808 that help set the creative theme of the ride, but also act as reference points 804 for the method 700. Additionally, some of the geometric shapes of the calibration target 102 build on the aesthetic style of the ride and act as reference points 804. In other examples, the calibration target may be a checkerboard calibration pattern 1008, such as on the calibration target 1004 discussed below.

In operation 706 a processing element determines position information for a detected reference point 804. For example, when a given reference point 804 is captured in an image from more than one camera 108, such as with cameras 108 with overlapping fields of view 802, the computing device 204 may recognize the reference point 804 and develop position information for the reference point 804 in 3D space. The position information for the reference point 804 may be represented as a vector of coordinates, as previously described, and may be stored in a memory 212.

In operation 708 a processing element adjusts calibration of the camera 108. The computing device 204 may locate the position of a camera 108 relative to the reference point 804, and calibrate the camera 108. For example, the computing device 204 may store the position of a camera 108 in a vector of coordinates in 3D space. The computing device 204 may adjust the position information of the camera 108 based on the position information of the reference point 804. For example, the position information of the reference point 804 may be used to locate cameras 108 relative to one another in the 3D space. In another example, the computing device 204 may use the position information of the reference point 804 to adjust images received from the camera 108 such as to adjust for properties of the camera optics, distortion like barrel, pincushion, or keystone distortion, chromatic aberration, sensitivity of the image sensor, or the like.

In operation 710 a processing element constructs a virtual representation of the physical environment 104 in 3D space. For example, the computing device 204 may use one or more reference points 804 as an origin of a coordinate system. The computing device 204 may use one reference point 804 as an origin of a coordinate system and may use other reference points 804 to check, adjust or calibrate the coordinate system as it extends through the 3D space.

Calibration such in the method 700 may be useful when cameras 108 are first installed in the physical environment 104, or when they are moved, such as by being jostled, or replaced, repaired, or the like. Additionally, the method 700 may be executed automatically based on events such as the start of a ride, or on a timed schedule (e.g., once a day or every time a ride vehicle starts a new trip through a ride) to automatically adjust for any changes or movements in the cameras 108, thus saving labor and time and helping to assure the pose detection system 100 is operating properly.

Figure 9:
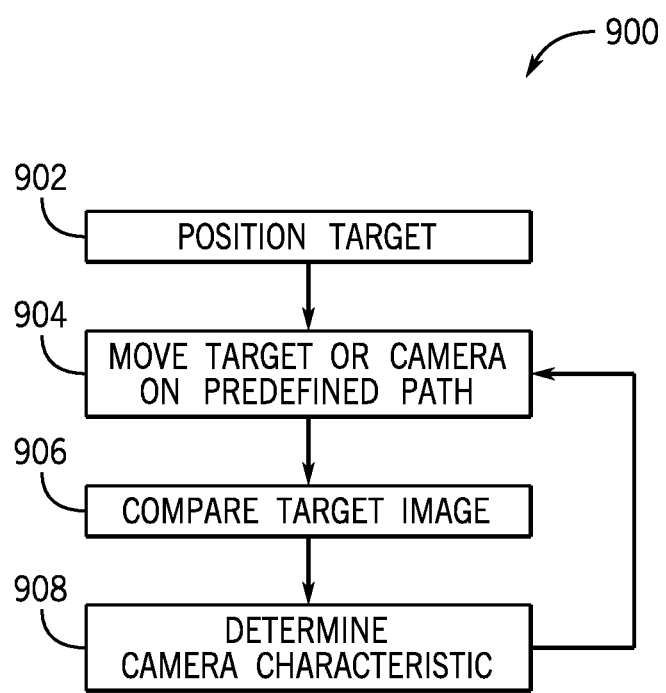
FIG. 9 is a flow chart illustrating a second method of calibration for the pose detection system of FIGS. 1A and 1B.
Figure 10:
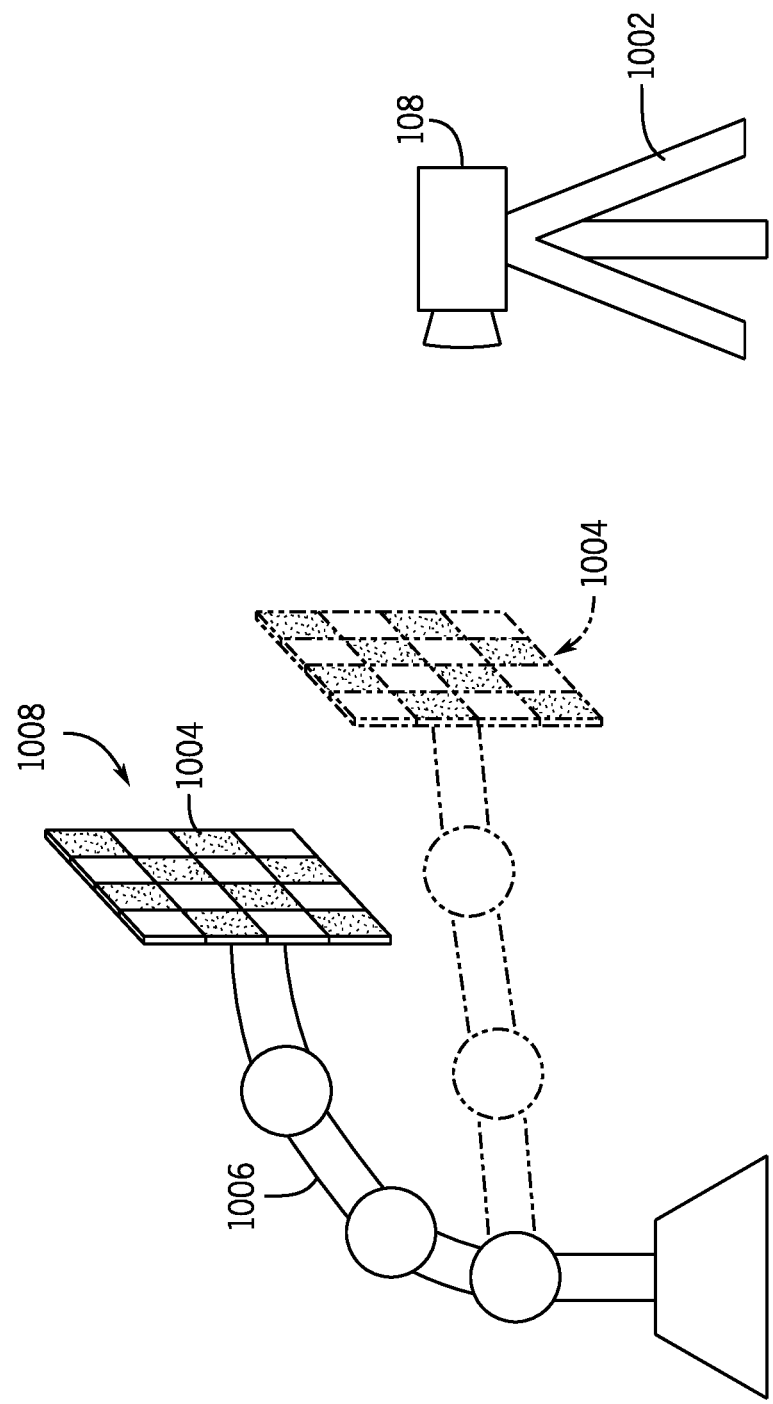
FIG. 10 is a schematic view of an example of a system for use with the second calibration method of FIG. 9.
Figure 11:
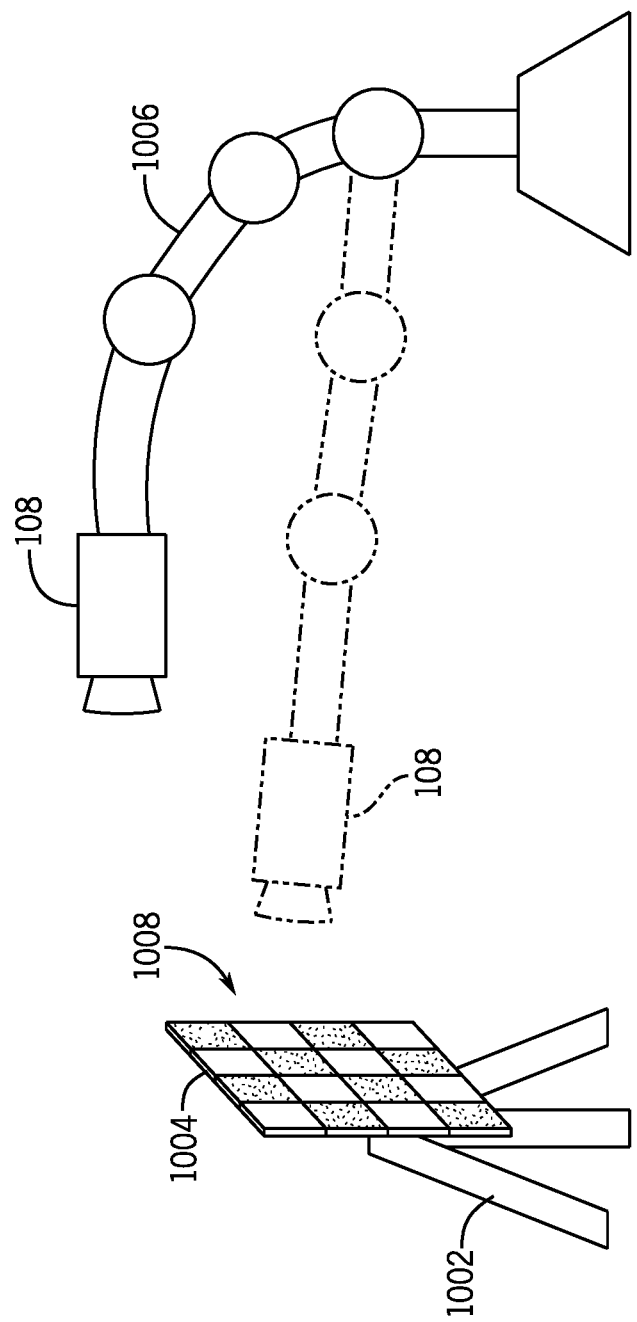
FIG. 11 is a schematic view of an example of a system for use with the second calibration method of FIG. 9.

FIGS. 9-11 illustrate an example of a second method 900 of calibrating a camera 108 of a pose detection system 100. The method 900 is further illustrated by the simplified schematic views of the calibration target 1004 and the camera 108 shown for example in FIG. 10 and FIG. 11. The operations of the method 900 may be executed in an order other than that shown in FIG. 8, and with other calibration targets than the one shown.

The method 900 may begin in operation 902 and the calibration target 1004 is positioned relative to a camera 108. In the example of FIG. 10, the calibration target 1004 is mounted on an actuator 1006 and the camera 108 is stationary. The camera 108 may be supported on a support 1002 such as a tripod or stand. In the example of FIG. 11, the calibration target 1004 is stationary, such as on a support 1002, and the camera 108 is mounted to an actuator 1006. The actuator 1006 shown for example in FIG. 10 is a robot that can articulate the calibration target 1004 relative to the camera 108, or vice versa, within 3D space. In various examples a robot has various degrees of freedom, such as one, two, three, four, five, six or more degrees of freedom, as desired. In other examples, the actuator 1006 can be a carriage or rig that rides on a track or other path, a solenoid, motor, or other suitable mechanism that can move the calibration target 1004 or camera 108 in 3D space. In operation 902, the actuator 1006 positions the calibration target 1004 or the camera 108 relative to the other of the calibration target 1004 or camera 108. In any operation of the method 900, the calibration target 1004 may be enhanced by an enhancer 110.

As shown in FIG. 10 and FIG. 11, the calibration target 1004 includes a checkerboard calibration pattern 1008. As discussed with respect to the calibration target 102, the calibration target 1004 may have graphical elements 806 that the computing device 204 or other processing element can recognize as reference points 804. Other calibration patterns may be used as desired, including creative graphics as discussed with respect to the method 700.

In operation 904 the actuator 1006 moves the calibration target 1004 or the camera 108 on a predefined path. For example, the actuator 1006 may move the calibration target 1004 to various distances and angles relative to the camera 108, or vice versa. As the calibration target 1004 or camera 108 moves along the path, the camera 108 captures images of the calibration target 1004 and may transmit them to a processing element, such as the processing element 206 of the computing device 204.

In operation 906 the images of the calibration target 1004 may be compared to one another by the computing device 204 or other processing element. Reference points 804 may be recognized in the images received.

In operation 908 the computing device 204 or other processing element determines characteristics of the camera 108, such as distortion or aberration as previously discussed. the computing device 204 may apply adjustments to account for the camera 108 characteristics, and may save individual camera 108 characteristics in memory 212 for future use in any method of the present disclosure.

The method 900 may have the advantage of enabling rapid and repeatable calibration of the camera 108. Such a method may be useful to save labor and/or time when calibrating a large number of cameras 108.

The above specifications, examples, and data provide a complete description of the structure and use of exemplary examples of the invention as defined in the claims. Although various examples of the disclosure have been described above with a certain degree of particularity, or with reference to one or more individual examples, those skilled in the art could make numerous alterations to the disclosed examples without departing from the spirit or scope of the claimed invention. Other examples are therefore contemplated. It is intended that all matter contained in the above description and shown in the accompanying drawings shall be interpreted as only illustrative of particular examples and not limiting. Changes in detail or structure may be made without departing from the basic elements of the invention as defined in the following claims.

All relative and directional references (including: upper, lower, upward, downward, left, right, leftward, rightward, top, bottom, side, above, below, front, middle, back, vertical, horizontal, right side up, upside down, sideways, and so forth) are given by way of example to aid the reader's understanding of the particular examples described herein. They should not be read to be requirements or limitations, particularly as to the position, orientation, or use unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other, unless specifically set forth in the claims. Any references to production or post-production are taken to apply to either production or post-production environments, methods and/or systems.

What is claimed is:

1. A method for providing an interactive experience comprising:
    illuminating, by an enhancer, an area with light having an infrared (IR) wavelength;
    capturing, by a first image detector, a first image in an IR spectrum of a person in the area including a portion of light emitted by the enhancer and reflected from the person;
    capturing, by a second image detector, a second image in the IR spectrum of the person in the area including the portion of light emitted by the enhancer and reflected from the person;
    detecting, by a processing element, a first image skeletal feature of the person in the first image in the area illuminated with light having the IR wavelength and detecting a second image skeletal feature of the person in the second image in the area illuminated with light having the IR wavelength;
    determining that the first image skeletal feature and the second image skeletal feature are the same and correspond to a first skeletal feature;
    combining, by the processing element, a position of the first image skeletal feature in the first image and a position of the second image skeletal feature in the second image to reconstruct a position characteristic of the person in the first image and the second image;
    determining, by the processing element, a motion characteristic of the first skeletal feature wherein the motion characteristic includes a predicted motion of the first skeletal feature, wherein the motion characteristic is based at least on a current motion of the first skeletal feature; and outputting, at a location of the first skeletal feature of the person and on a wearable article attached to the first skeletal feature of the person, in response to determining the motion characteristic of the first skeletal feature and in response to determining that the position characteristic and the predicted motion of the first skeletal feature reach a target gesture, an interactive effect based on the position characteristic and the predicted motion of the first skeletal feature, wherein the location is determined based on the predicted motion of the first skeletal feature.

2. The method of claim 1, further comprising:
constructing, by the processing element, a vector in three dimensions corresponding to the position characteristic of the person in the first image and the second image; and
determining the motion characteristic of the first skeletal feature based on a change of the vector over time.

3. The method of claim 2, further comprising determining a first gesture of the person based on at least one of the position characteristic and the motion characteristic of the first skeletal feature.

4. The method of claim 1, wherein the position characteristic or the motion characteristic is further determined based on a past position characteristic or motion characteristic.

5. The method of claim 3, wherein the interactive effect is based on the first gesture.

6. The method of claim 3, further comprising:
receiving, by the first image detector or the second image detector, additional images of the person; and
determining, by the processing element, a second skeletal feature of the person from the additional images.

7. The method of claim 6, wherein the first image, the second image and the additional images are captured adjacent one another in time, separated by a predetermined amount of time.

8. The method of claim 7, wherein the predetermined amount of time is determined by a frame rate of the first image detector or the second image detector.

9. The method of claim 6, further comprising determining, by the processing element, a position characteristic of the second skeletal feature.

10. The method of claim 9, further comprising determining a motion characteristic of the second skeletal feature based on a change in the position characteristic of the second skeletal feature over time.

11. The method of claim 10, further comprising determining a second gesture of the person based on the position characteristic or the motion characteristic of the second skeletal feature.

12. The method of claim 11, further comprising determining a compound gesture of the person based on the first gesture and the second gesture.

13. The method of claim 1, wherein the motion characteristic is one of a speed, velocity, or acceleration of the first skeletal feature.

14. The method of claim 1, wherein the enhancer, the first image detector, and the second image detector are fixed to a vehicle adapted to receive the person and comprising the area.

15. The method of claim 14, wherein the vehicle is in motion.

16. The method of claim 1, wherein the wavelength is above 850 nanometers.

17. The method of claim 1, wherein the first image detector and the second image detector have overlapping fields of view.

18. The method of claim 17, further comprising:
detecting a reference point in a calibration target in one of the first image or the second image; and
adjusting a calibration of one of the first image detector or the second image detector.

19. The method of claim 18, wherein the calibration target includes a graphic.

20. The method of claim 1, wherein the processing element determines the first skeletal feature using an artificial intelligence or machine learning algorithm.

21. A method for providing an interactive experience comprising:
illuminating, by an enhancer, an area with light having an infrared (IR) wavelength;
capturing, by a first image detector, a first image in an IR spectrum of a person in the area including a portion of light emitted by the enhancer and reflected from the person;
capturing, by a second image detector, a second image in the IR spectrum of the person in the area including the portion of light emitted by the enhancer and reflected from the person;
activating an artificial intelligence or machine learning algorithm trained with images comprising labeled physical poses and joints;
determining, by a processing element using the artificial intelligence or machine learning algorithm, a first skeletal feature of the person in the area illuminated with light having the IR wavelength based on at least the first image and the second image, wherein determining the first skeletal feature comprises using the artificial intelligence or machine learning algorithm to detect pixels in at least the first image and the second image corresponding to the first skeletal feature of the person and to ignore dark pixels detected in the first image and the second image;
determining, by the processing element using the artificial intelligence or machine learning algorithm, a position characteristic of the first skeletal feature;
determining, by the processing element using the artificial intelligence or machine learning algorithm, a motion characteristic of the first skeletal feature, wherein the motion characteristic includes a predicted motion of the first skeletal feature, wherein the motion characteristic is based at least on a current motion of the first skeletal feature; and
outputting, at a location of the first skeletal feature of the person and on a wearable article attached to the first skeletal feature of the person, in response to determining the motion characteristic of the first skeletal feature and in response to determining that the position characteristic and the predicted motion of the first skeletal feature reach a target gesture, an interactive effect based on the position characteristic and the predicted motion of the first skeletal feature, wherein the location is determined based on the predicted motion of the first skeletal feature.

22. The method of claim 21, wherein the artificial intelligence or machine learning algorithm is trained with images corresponding to skeletal features.

23. The method of claim 21, wherein the artificial intelligence or machine learning algorithm is activated when a relevant skeletal feature is detected.

24. A method for providing an interactive experience comprising:
- illuminating, by an enhancer, an area with light having an infrared (IR) wavelength;
- capturing, by a first image detector, a first image in an IR spectrum of a person in the area including a portion of light emitted by the enhancer and reflected from the person;
- capturing, by a second image detector, a second image in the IR spectrum of the person in the area including the portion of light emitted by the enhancer and reflected from the person;
- determining, by a processing element, a first skeletal feature of the person in the area illuminated with light having the IR wavelength based on at least the first image and the second image;
- determining, by the processing element, a position characteristic of the first skeletal feature;
- determining, by the processing element, a motion characteristic of the first skeletal feature, wherein the motion characteristic includes a predicted motion of the first skeletal feature, wherein the motion characteristic is based at least on a current motion of the first skeletal feature; and
- outputting, at a location of the first skeletal feature of the person and on a wearable article attached to the first skeletal feature of the person, in response to determining the motion characteristic of the first skeletal feature and in response to determining that the position characteristic and the predicted motion of the first skeletal feature reach a target gesture, an interactive effect based on the position characteristic and the predicted motion of the first skeletal feature, wherein the location is determined based on the predicted motion of the first skeletal feature.

25. The method of claim 24, further comprising filtering, with a filter, light emitted from a light source.

26. The method of claim 25, wherein the filter is positioned between the light source and the area.

27. A method for providing an interactive experience comprising:
- illuminating, by an enhancer, an area with light having an infrared (IR) wavelength;
- capturing, by a first image detector, a first image in an IR spectrum of a person in the area including a portion of light emitted by the enhancer and reflected from the person;
- capturing, by a second image detector, a second image in the IR spectrum of the person in the area including the portion of light emitted by the enhancer and reflected from the person;
- determining, by a processing element, a first skeletal feature of the person in the area illuminated with light having the IR wavelength based on at least the first image and the second image;
- determining, by the processing element, a position characteristic of the first skeletal feature;
- determining, by the processing element, a motion characteristic of the first skeletal feature, wherein the motion characteristic includes a predicted motion of the first skeletal feature, wherein the motion characteristic is based at least on a current motion of the first skeletal feature; and
- outputting, at a location of the first skeletal feature of the person and on a wearable article attached to the first skeletal feature of the person, in response to determining the motion characteristic of the first skeletal feature, an interactive effect based on the position characteristic and the predicted motion of the first skeletal feature, wherein the location is determined based on the predicted motion of the first skeletal feature.

28. The method of claim 27, wherein the interactive effect is displayed in response to the position characteristic and the predicted motion of the first skeletal feature reaching a target gesture.

29. The method of claim 27, wherein the interactive effect is outputted simultaneously with the current motion of the first skeletal feature.

* * * * *